March 18, 1958     P. K. HISER     2,827,610
OSCILLATORY FRICTION ELIMINATOR
Filed April 15, 1953
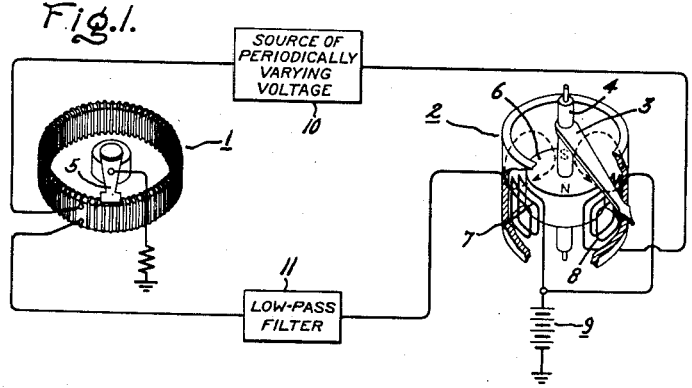
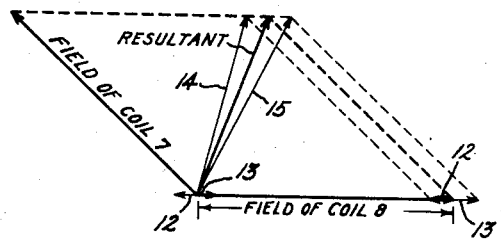
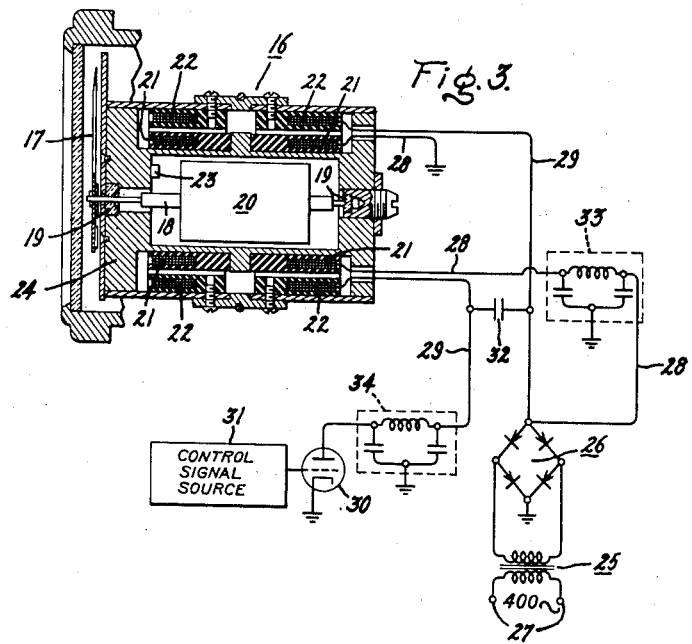
Inventor:
Paul K. Hiser,
by Richard E. Hosley
His Attorney.

United States Patent Office 2,827,610
Patented Mar. 18, 1958

2,827,610

OSCILLATORY FRICTION ELIMINATOR

Paul K. Hiser, Peabody, Mass., assignor to General Electric Company, a corporation of New York Application April 15, 1953, Serial No. 348,996

6 Claims. (Cl. 324—155)

The present invention relates to low-friction angularly movable mechanisms and, more particularly, to sensitive indicating instruments having electromagnetic oscillatory arrangments for reducing bearing frictions.

While excellent accuracies of the angular movements of a rotatable member may readily be achieved in apparatus developing torques sufficiently large to overcome high bearing frictions, it has been extremely difficult to secure desired accuracies in apparatus functioning with relatively weak torques though even the most sensitive pivots are employed. By way of illustration, many aircraft panel instruments comprise the receiver elements of electrical telemetering systems wherein only low torques are developed to actuate the receiver rotor shafts and pointers, and finely-made jewel pivots have not entirely sufficed to eliminate variations in rotor shaft friction or actual sticking of the shaft, such as may occur under conditions of high acceleration. During flight in those installations upon craft powered by piston-actuated engines, it has been found that the continuous ambient vibrations affecting such instruments produced a distinctly beneficial effect upon the rotor shaft friction characteristics. Apparently, the small amplitude vibratory motions of the rotor shafts in their jewel pivots reduced the net loading in any direction and precluded sticking between the shafts and any portions of the jewel surfaces. However, with the advent of jet-powered aircraft experiencing almost no appreciable sustained vibration, the instrument friction problems have reappeared and have been unsolved in instruments utilizing conventional low-cost bearings.

In accordance with the present invention, improvement of these instrument friction characteristics is realized by inducing low-amplitude and high-frequency mechanical oscillation of a rotatable member in its bearings through electromagnetic vibratory apparatus energized from a source of high frequency periodically-varying electrical power. This unique combination, which requires no unorthodox low-friction bearings, operates to minimize friction errors by angularly oscillating the rotatable member about its proper angular orientation, rather than by vibrating it at random. The oscillatory motion, being of such small amplitude and high frequency, is hardly perceptible and does not detract from accuracies otherwise attainable with the instrument when friction effects are neglected. Further, inasmuch as the oscillations are produced angularly about the axis of rotation, rather than radially between pivots and bearings, an accurate mating of pivots and bearings may be employed in instruments meeting rigid accuracy requirements.

Accordingly, it is one object of the present invention to provide novel and improved arrangements for minimizing friction effects in sensitive instruments.

A second object is to provide improved apparatus having electromagnetic oscillatory arrangements minimizing peak frictions of rotatable members.

Further, it is an object to provide a sensitive direct current indicating instrument having an angularly movable rotor electromagnetically oscillated by a super-imposed alternating current signal.

By way of a summary account of one aspect of this invention, a direct current selsyn indicator having a jewel-mounted permanent magnet rotor with an attached pointer has one of its two angularly-displaced actuating windings energized by a high-frequency low-amplitude signal superimposed upon the unidirectional signal applied to that winding. Filters are provided in circuit with the windings to insure maximum transfer of the high-frequency energy to the one winding and a minimum transfer of excitation to the other winding. The alternating magnetic fields established by the winding excited by the alternating signal react with the unidirectional field from the permanent magnet rotor to apply rapidly alternating torques about the rotor axis, which torques set up a rapid low-amplitude rotor oscillation about its axis of rotation. Such sustained oscillations preclude jamming of the rotor pivots in their bearings or sticking of pivots due to accelerations and peaks of friction along the range of rotor rotation.

Although the features of this invention which are believed to be novel are set forth in the appended claims, greater detail of the invention itself and the further objects and advantages thereof may be readily comprehended by reference to the following description taken in connection with the accompanying drawing, wherein:

Fig. 1 is a partly pictorial and partly schematic representation of a telemetering system incorporating this invention;

Fig. 2 is a vector diagram illustrating the operation of an indicating instrument having my improved arrangement for minimizing friction effects; and Fig. 3 depicts schematic circuit details and a sectionalized view of an indicating instrument in a preferred embodiment of the invention.

In Fig. 1, a direct current selsyn transmitter 1 is illustrated in circuit with a selsyn receiver or indicator 2 actuating a movable pointer 3 which is supported by a shaft 4 mounted in low-friction bearings, not shown. Minute oscillations of the indicator rotor shaft 4 about its axis of rotation are introduced electromagnetically to offset any tendency of the shaft to jam or stick in the bearings, as appears more fully hereinafter. Transmitter 1 comprises a variable resistance with a fixed tap at each end and a variable tap established by a rotatable contact arm 5 which is coupled with a ground connection, such that the angular positions of arm 5 proportion the resistances existing between the common ground and each end tap. Receiver 2 comprises a permanently magnetized rotor 6, which angularly orients the shaft 4 and pointer 3, and a pair of actuating stator coils 7 and 8 having their axes arranged radially in relation to shaft 4 and with approximately 140 degrees angular displacement between these axes. Each of coils 7 and 8 is connected serially with one end tap of the transmitter and with a direct current power source 9, whereby the radial magnetic fluxes established by the coils are proportioned in accordance with the amounts of current flow therethrough determined by the angular positions of transmitter contact arm 5. The two magnetic fields combine to form a resultant flux with which the magnetic rotor 6 and pointer 3 become aligned, thereby producing indicator outputs which are related to the angular orientations of the transmitter arm 5. The vector diagram of Fig. 2 represents the angularly-displaced magnetic fields of indicator coils 7 and 8 as well as their resultant.

In circuit with coil 8 only, there is provided a source of periodically-varying voltage 10, such as a simple high-frequency low-amplitude alternating voltage, a low-pass filter 11 being employed to prevent flow of current from source 10 through the other coil, 7, if this proves to be necessary. The alternating current which flows through coil 8 from source 10 establishes a small superimposed electromagnetic field or flux which is angularly coincident with the unidirectional flux from that coil but alternately adds to or subtracts from it such that the resultant field from that coil has small periodic fluctuations in amplitude only. The resultant of the unidirectional field from coil 7 and the fluctuating field from coil 8 is likewise a periodically-varying one, the variations occurring in both the amplitude and phase of that resultant. These phase variations represent shifts in the position into which the indicator rotor 6 seeks to fall in alignment, and, the rotor inertia and variations in the direction of the resultant field and strength of the resultant field being properly proportioned, the rotor oscillates rapidly, though hardly perceptibly, in angular directions about its axis of rotation. Bearing friction problems of the type heretofore mentioned are thereby eliminated.

Referring further to Fig. 2 for clarification of the operation, it should be noted that the small-amplitude alternating field vectors 12 and 13 alternately add to and subtract from the vector field of coil 8. Accordingly, the resultant field is as shown by vector 14 when the alternating field is fully subtracted from the field of coil 8, and is as shown by vector 15 when the alternating field is fully added to the field of coil 8. The phase of the resultant field thus has periodic variations about the phase it would have in the absence of the alternating field component, and the permanent magnet rotor attempts to align itself with the instantaneous phase positions of the resultant flux.

A preferred embodiment portrayed in Fig. 3 includes a panel-type indicator 16 having an indicating pointer 17 carried by a rotor shaft 18 which is supported in jewel bearings 19 and is actuated angularly by an attached cylindrical permanent magnet armature 20. This current ratio indicator, like that of Fig. 1, includes two angularly-displaced stator coils, 21 and 22, which produce radial magnetic fields and a resultant magnetic field with which the permanent magnet rotor 20 becomes angularly aligned. A rotor centering torque is derived from the field of a small permanent magnet 23 affixed to the stator frame 24 with which the stator coils are also mounted. Electrical power for the actuating coils 21 and 22 is supplied by a combination of transformer 25 and full-wave bridge rectifier 26 energized from 400 cycle supply terminals 27. Since indicator 16 operates with one coil, 21, energized with a substantially constant current, that coil is excited by the full unidirectional voltage appearing across the bridge output terminals, through leads 28. The other coil, 22, carries currents of variable magnitudes from the same bridge output terminals and through leads 29, the currents being regulated by the varying impedance of a serially-coupled vacuum tube 30 which has its control grid energized by a source of control signals, 31. Indicator pointer 17 is thus angularly oriented in accordance with the values of control signals applied to the grid of tube 30 by source 31.

Fluctuating voltages for addition to the unidirectional voltage applied to actuating coil 22 are derived from the output of bridge rectifier 26. Although that full wave rectifier output is substantially unidirectional and unvarying, there is present a small voltage component which is a second harmonic of the input frequency of 400 cycles per second. This 800 cycle harmonic component is utilized in inducing the rotor oscillations which minimize the bearing friction effects. In accomplishing the flow of appreciable 800 cycle currents through coil 22 to bring about the rotor oscillations, the coil itself is designed to have an inductance which forms a parallel resonant circuit having a resonant frequency of 800 cycles in parallel with a suitable condenser 32. Filter 33 in circuit with constant-current coil 21 serves to preclude voltage variations in the bridge output delivered to that coil, and filter 34 in circuit with coil 22 wherein 800 cycle current must flow is designed to remove signals of frequencies in excess of 800 cycles such that the second harmonic signal is most effectively utilized in coil 22. The indicator operation is like that already described with reference to Figs. 1 and 2.

Attention is drawn to the fact that this invention is applicable to any movable magnet instruments having electromagnetic actuating coils. The oscillation signals may of course be applied to one or more of such actuating coils, provided the resultant electromagnetic fluxes have rapidly oscillating positions.

Inasmuch as the specific embodiments of this invention disclosed herein are of a descriptive rather than a limiting nature, it will be apparent that various changes, combinations, substitutions or modifications may be employed in accordance with these teachings without departing in spirit or scope from this invention in its broader aspects.

What I claim as new and desire to secure by Letters Patent of the United States is:

1. An electromagnetic instrument arrangement comprising a permanent magnet rotor, a rotor shaft supporting said rotor for angular movement about an axis, bearing means pivotally supporting said shaft about said axis, a pair of electrical stator windings disposed proximately with said rotor for producing magnetic fields exerting torques on said rotor about said axis, means applying unidirectional voltage to one of said windings and superimposed unidirectional and high-frequency low-amplitude voltages to the other of said windings, and control means adjusting the current flow in at least one of said windings, said high-frequency low-amplitude voltage having amplitude variations and a frequency which cause minute angular oscillations of said rotor shaft in said bearing means.

2. An electromagnetic instrument arrangement comprising a permanent magnet rotor, a rotor shaft supporting said rotor for angular movement about an axis, bearing means pivotally supporting said shaft about said axis, an instrument pointer affixed to said shaft, at least two electrical stator windings disposed proximately with said rotor for producing electromagnetic fields exerting torques on said rotor about said axis, means applying unidirectional voltage to one of said windings and superimposed unidirectional and high-frequency low-amplitude voltages to the other of said windings, and means controlling the current flow in at least one of said windings to control the angular orientations of said rotor and pointer, said voltage frequency and amplitude being proportioned to cause angular oscillations of said shaft in said bearing means without readily perceptible pointer movements.

3. An electromagnetic instrument arrangement as set forth in claim 2 wherein said voltage applying means comprises a source of alternating voltage, and means rectifying said voltage to produce a substantially unidirectional voltage having a periodically-varying component which is said high-frequency low-amplitude voltage, and further comprising a capacitance paralleled with said other winding, said capacitance forming a parallel resonance circuit with said other winding having a resonant frequency which is the same as said voltage frequency.

4. An electromagnetic current ratio instrument arrangement comprising a permanent magnet rotor, a rotor shaft supporting said rotor for angular movement about an axis, sensitive bearings pivotally supporting said shaft about said axis, first and second stator windings angularly displaced from one another about said axis and disposed to produce magnetic fields with the resultant of which said rotor angularly aligns itself, a source of alternating voltage, rectifier means translating said alternating voltage into a substantially unidirectional voltage having a high-frequency low-amplitude voltage component, means applying unidirectional voltage to said first winding and applying said unidirectional voltage with said voltage component to said second winding, means controlling the current flow through at least one of said windings to control the angular orientation of said rotor about said axis, and electrical capacitance means coupled in parallel with said second winding to form a parallel resonant circuit having a resonant frequency substantially the same as the said voltage component frequency.

5. An electromagnetic instrument arrangement comprising a rotor producing a unidirectional magnetic flux; means pivotally supporting said rotor for angular movements about an axis; a plurality of electrical stator windings disposed proximately with said rotor for producing resultant electromagnetic fields exerting torques on said rotor about said axis; means applying to said stator windings controlled unidirectional voltages to control the angular orientations of said rotor; and means applying to a number of said stator windings less than the total number of said windings superposed periodically varying potentials having amplitudes small in relation to the amplitudes of said unidirectional voltages, whereby said rotor is rapidly and continuously oscillated in said pivotal supporting means through minute angles in response to said periodically varying flux.

6. An electromagnetic instrument arrangement comprising a rotor producing a unidirectional magnetic flux; means pivotally supporting said rotor for angular movements about an axis; a plurality of electrical stator windings disposed proximately with said rotor for producing resultant electromagnetic fields exerting torques on said rotor about said axis; means producing both unidirectional actuating voltage and periodically varying high frequency voltage having an amplitude small in relation to the magnitude of said unidirectional voltage; means applying unidirectional voltage to a first of said windings and applying said unidirectional actuating voltage and periodically varying voltage to a second of said windings; and means controlling the current flow through at least one of said windings to control the angular orientation of said rotor about said axis, whereby said rotor is rapidly and continuously oscillated in said pivotal supporting means through minute angles in response to said periodically varying flux.

References Cited in the file of this patent
UNITED STATES PATENTS

| | | |
|---|---|---|
| 654,103 | Schrottke | July 17, 1900 |
| 677,957 | Davis | July 9, 1901 |
| 678,236 | Fish | July 9, 1901 |
| 2,427,180 | Ballard | Sept. 9, 1947 |
| 2,452,244 | Knudsen | Oct. 26, 1948 |
| 2,486,641 | Gilbert | Nov. 1, 1949 |
| 2,498,261 | Fritzinger | Feb. 21, 1950 |